A. M. LAYCOCK.
ROLLER BEARING.
APPLICATION FILED APR. 18, 1916.

1,194,043.

Patented Aug. 8, 1916.

Witnesses
G. H. Baker
H. P. Jennings

Inventor
Arthur M. Laycock
by Foster Freeman Watson & Coit
Attorneys

UNITED STATES PATENT OFFICE.

ARTHUR M. LAYCOCK, OF KINGSTON, PENNSYLVANIA.

ROLLER-BEARING.

1,194,043.  Specification of Letters Patent.  Patented Aug. 8, 1916.

Application filed April 18, 1916.  Serial No. 91,991.

*To all whom it may concern:*

Be it known that I, ARTHUR M. LAYCOCK, a subject of the King of Great Britain, and residing at Kingston, county of Luzerne, State of Pennsylvania, have invented certain new and useful Improvements in Roller-Bearings, of which the following is a specification.

The invention relates to roller bearings. Its principal objects are to provide a simple means whereby the bearing may be assembled and the rollers held in position against axial displacement.

Other objects will appear from the description as it proceeds.

The bearing comprises inner and outer rings with interposed rollers. These rollers are prevented from axial displacement by suitable means which includes a flange attached to one of the rings in a novel manner.

The invention comprises the construction for attaching the last mentioned flange to the ring.

Figure 1:
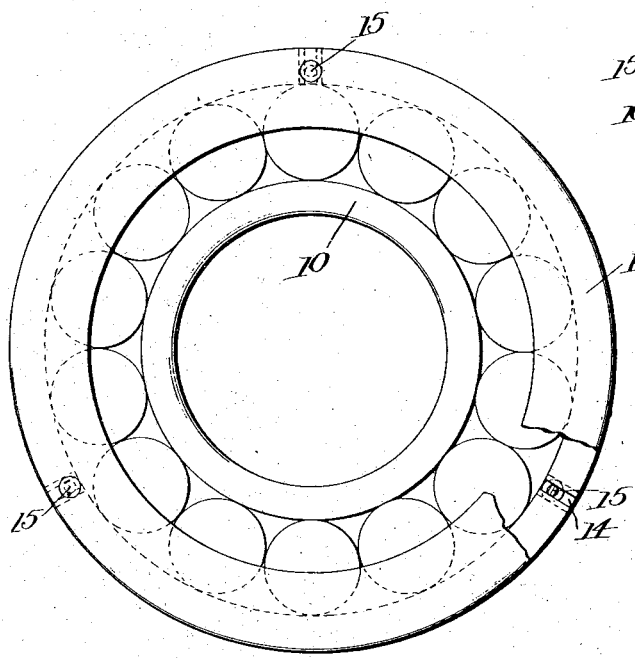
Figure 2:
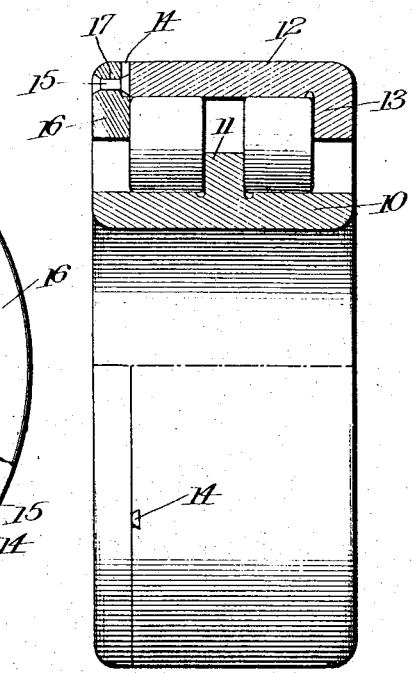
Figure 3:
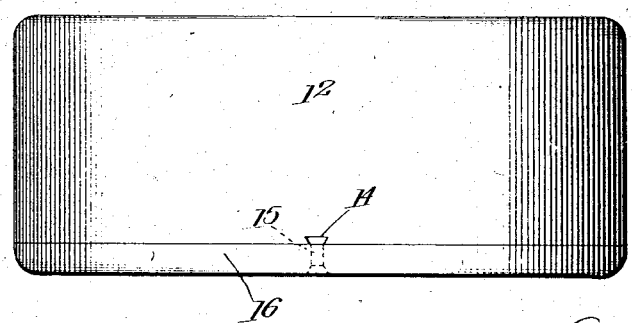

In the drawings, Figure 1 is an end elevation of a bearing embodying the invention and with part of the flange broken away to show a detail; Fig. 2 is a half section and half elevation view; Fig. 3 is a top plan view.

The bearing comprises an inner ring 10 and an outer ring 12. As shown, the bearing is of the two-row type, although the invention is applicable to other types. The inner ring is provided with a medially located outwardly extending radial flange 11, and the outer ring may be provided with an inwardly extending flange 13 at one end. The face at the opposite end of the outer ring is formed with a plurality of radially extending dove-tail grooves 14. A pin or rivet 15 having a flat countersunk head is inserted and pushed inwardly in each groove, and the rivets thus assume positions parallel with the axis of the bearing, and lie in a circle about the said axis.

An annulus 16 is provided with a set of apertures 17 arranged in a circle, and each aperture adapted to take over a rivet. The outside ends of the apertures are countersunk, so that the ends of the rivets or pins may be headed up or riveted up, thus firmly securing the annulus to the outer ring. The annulus therefore forms a flange which corresponds to the flange 13 on the other side of the bearing.

The bearing is assembled by placing the rollers in position between the rings. The flange is then pushed on the pins or rivets, and the ends of the latter riveted over.

It will thus be seen that I have provided a very simple, inexpensive, and yet strong means for assembling roller bearings.

Having described the invention, what is claimed and desired to be secured by Letters Patent is:

1. In a roller bearing, an outer ring, an inner ring, interposed rollers, a flange, means for attaching said flange to one of the rings, comprising rivets carried by the flange and having a dove-tailed connection with the last mentioned ring.

2. In a roller bearing, an outer ring, an inner ring, interposed rollers, a flange, one of the rings provided with dove-tail grooves in an end face thereof, apertures in the flange, rivets coöperating with the grooves and apertures to attach the flange to the last mentioned ring.

3. In a roller bearing, an outer ring, an inner ring, interposed rollers, axially extending pins carried by one of the rings on its end face, a flange carried by said pins, the pins adapted to have their outer ends riveted over to thereby hold the flange in position.

In testimony whereof I affix my signature.

ARTHUR M. LAYCOCK.